US008126162B2

(12) United States Patent
Zhang et al.

(10) Patent No.: US 8,126,162 B2
(45) Date of Patent: Feb. 28, 2012

(54) AUDIO SIGNAL INTERPOLATION METHOD AND AUDIO SIGNAL INTERPOLATION APPARATUS

(75) Inventors: Chunmao Zhang, Kanagawa (JP); Toru Chinen, Kanagawa (JP)

(73) Assignee: Sony Corporation, Tokyo (JP)

( * ) Notice: Subject to any disclaimer, the term of this patent is extended or adjusted under 35 U.S.C. 154(b) by 1295 days.

(21) Appl. No.: 11/752,868

(22) Filed: May 23, 2007

(65) Prior Publication Data

US 2008/0056511 A1 Mar. 6, 2008

(30) Foreign Application Priority Data

May 24, 2006 (JP) ................................ 2006-144480

(51) Int. Cl.
*H04B 15/00* (2006.01)

(52) U.S. Cl. ......... 381/94.4; 700/94; 704/236; 704/245; 704/256.3; 704/265; 704/211; 704/E19.031

(58) Field of Classification Search ................ 381/94.4, 381/61; 700/94; 704/256.3, 207, 211, 265, 704/233, 236, 226, 245, 227, 240, 201, E19.031
See application file for complete search history.

(56) References Cited

U.S. PATENT DOCUMENTS 5,572,593 A * 11/1996 Nejime et al. ................ 381/312
5,884,253 A 3/1999 Kleijn
2007/0242633 A1* 10/2007 Roberts et al. ................ 370/312
2007/0242833 A1* 10/2007 Herre et al. .................... 381/61
2010/0161086 A1* 6/2010 Andersen ....................... 700/94

OTHER PUBLICATIONS

Ismo Kauppinen et al., "Audio Signal Extrapolation—Theory and Applications", Proc. of the $5^{th}$ Int. Conference on Digital Audios Effects ($DAF_x$-02), Hamburg, Germany, Sep. 26-28, 2002.

Walter Etter, "Restoration of a Discrete-Time Signal Segment by Interpolation Based on the Left-Sided and Right-Sided Autoregressive Parameters", IEEE Transactions on Signal Processing, vol. 44, No. 5, May 1996.

* cited by examiner

*Primary Examiner* — Davetta W Goins
*Assistant Examiner* — Disler Paul
(74) *Attorney, Agent, or Firm* — Finnegan, Henderson, Farabow, Garrett & Dunner, L.L.P.

(57) ABSTRACT

An audio signal interpolation apparatus is configured to perform interpolation processing on the basis of audio signals preceding and/or following a predetermined segment on a time axis so as to obtain an audio signal corresponding to the predetermined segment. The audio signal interpolation apparatus includes a waveform formation unit configured to form a waveform for the predetermined segment on the basis of time-domain samples of the preceding and/or the following audio signals and a power control unit configured to control power of the waveform for the predetermined segment formed by the waveform formation unit using a non-linear model selected on the basis of the preceding audio signal when the power of the preceding audio signal is larger than that of the following audio signal, or the following audio signal when the power of the preceding audio signal is smaller than that of the following audio signal.

11 Claims, 22 Drawing Sheets

AUDIO SIGNAL WAVEFORM OBTAINED BY KNOWN INTERPOLATION METHOD

ORIGINAL AUDIO SIGNAL WAVEFORM

AUDIO SIGNAL INTERPOLATION METHOD AND AUDIO SIGNAL INTERPOLATION APPARATUS

CROSS REFERENCES TO RELATED APPLICATIONS

The present invention contains subject matter related to Japanese Patent Application JP 2006-144480 filed in the Japanese Patent Office on May 24, 2006, the entire contents of which are incorporated herein by reference.

BACKGROUND OF THE INVENTION

1. Field of the Invention

The present invention relates to an audio signal interpolation method and an audio signal interpolation apparatus for performing interpolation to compensate for an audio signal lost due to the occurrence of an error or the like.

2. Description of the Related Art

Interpolation techniques for processing of audio signals including acoustic signals and speech signals are widely used for signal processing such as codec processing, synthesis processing, or error correction processing, and signal transmission processing.

Known speech synthesis or audio signal interpolation is performed in two stages, that is, an analysis stage and a formation stage (see, for example, Audio Extrapolation—Theory and Applications). First, in the analysis stage, signals preceding and/or following an interpolation segment are analyzed. This analysis includes assumption of a pitch period, classification of signals into periodic signals and noise signals performed to determine whether a signal has periodicity, and power computation. Next, in the formation stage, a signal for the interpolation segment is formed by performing extrapolation using pitch periods of the signals preceding and/or following the interpolation segment, and then power of the formed signal is controlled.

SUMMARY OF THE INVENTION

However, in known pitch extrapolation methods, pitches of the preceding and/or following signals are merely copied so as to form an audio signal. Accordingly, if pitch periods of the preceding and following signals are different, the formed pitch becomes discontinuous.

Furthermore, if linear extrapolation or linear interpolation is performed on the basis of power of the preceding and/or following signals so as to control power of the interpolation segment, the power of the interpolation segment is controlled unnaturally. This phenomenon becomes most notable in a certain portion where extrapolation or interpolation is performed.

For example, as shown in FIGS. 21A and 21B, if linear extrapolation is performed using audio signals preceding and following an interpolation segment as represented by dotted lines shown in FIGS. 21A and 21B so as to calculate power of the interpolation segment, a signal waveform shown in FIG. 22A is generated. Here, as is apparent from comparison of the signal waveform shown in FIG. 22A and an original signal waveform shown in FIG. 22B, power markedly decreases in a portion where pitches of the preceding and following signals overlap. In addition, if the pitches of the preceding and following signals overlap, an amplitude of the generated signal waveform becomes continuous while a phase thereof is still discontinuous.

It is desirable to provide an audio signal interpolation method and an audio signal interpolation apparatus capable of achieving a natural sound quality.

An audio signal interpolation method according to an embodiment of the present invention performs interpolation processing on the basis of audio signals preceding and/or following a predetermined segment on a time axis so as to obtain an audio signal corresponding to the predetermined segment. The audio signal interpolation method includes the steps of: forming a waveform for the predetermined segment on the basis of time-domain samples of the preceding and/or the following audio signals; and controlling power of the formed waveform for the predetermined segment using a non-linear model selected on the basis of the preceding audio signal when the power of the preceding audio signal is larger than that of the following audio signal, or the following audio signal when the power of the preceding audio signal is smaller than that of the following audio signal.

An audio signal interpolation apparatus is configured to perform Interpolation processing on the basis of audio signals preceding and/or following a predetermined segment on a time axis so as to obtain an audio signal corresponding to the predetermined segment. The audio signal interpolation apparatus includes a waveform formation unit configured to form a waveform for the predetermined segment on the basis of time-domain samples of the preceding and/or the following audio signals and a power control unit configured to control power of the waveform for the predetermined segment formed by the waveform formation unit using a non-linear model selected on the basis of the preceding audio signal when the power of the preceding audio signal is larger than that of the following audio signal, or the following audio signal when the power of the preceding audio signal is smaller than that of the following audio signal.

Thus, a waveform for a predetermined segment is formed on the basis of time-domain samples of audio signals preceding and/or following the predetermined segment on a time axis. Power of the formed waveform for the predetermined segment is controlled using a non-linear model selected on the basis of the preceding audio signal when the power of the preceding audio signal is larger than that of the following audio signal, or the following audio signal when the power of the preceding audio signal is smaller than that of the following audio signal. Accordingly, according to an audio signal interpolation method and an audio signal interpolation apparatus according to an embodiment of the present invention, natural sound quality can be obtained.

DESCRIPTION OF THE PREFERRED EMBODIMENTS

Embodiments of the present invention will be described in detail with reference to the accompanying drawings. An audio signal interpolation apparatus according to an embodiment of the present invention generates an interpolated frame using audio signals of frames preceding and/or following the interpolation frame so as to compensate for a predetermined frame lost due to occurrence of an error or the like.

Figure 1:
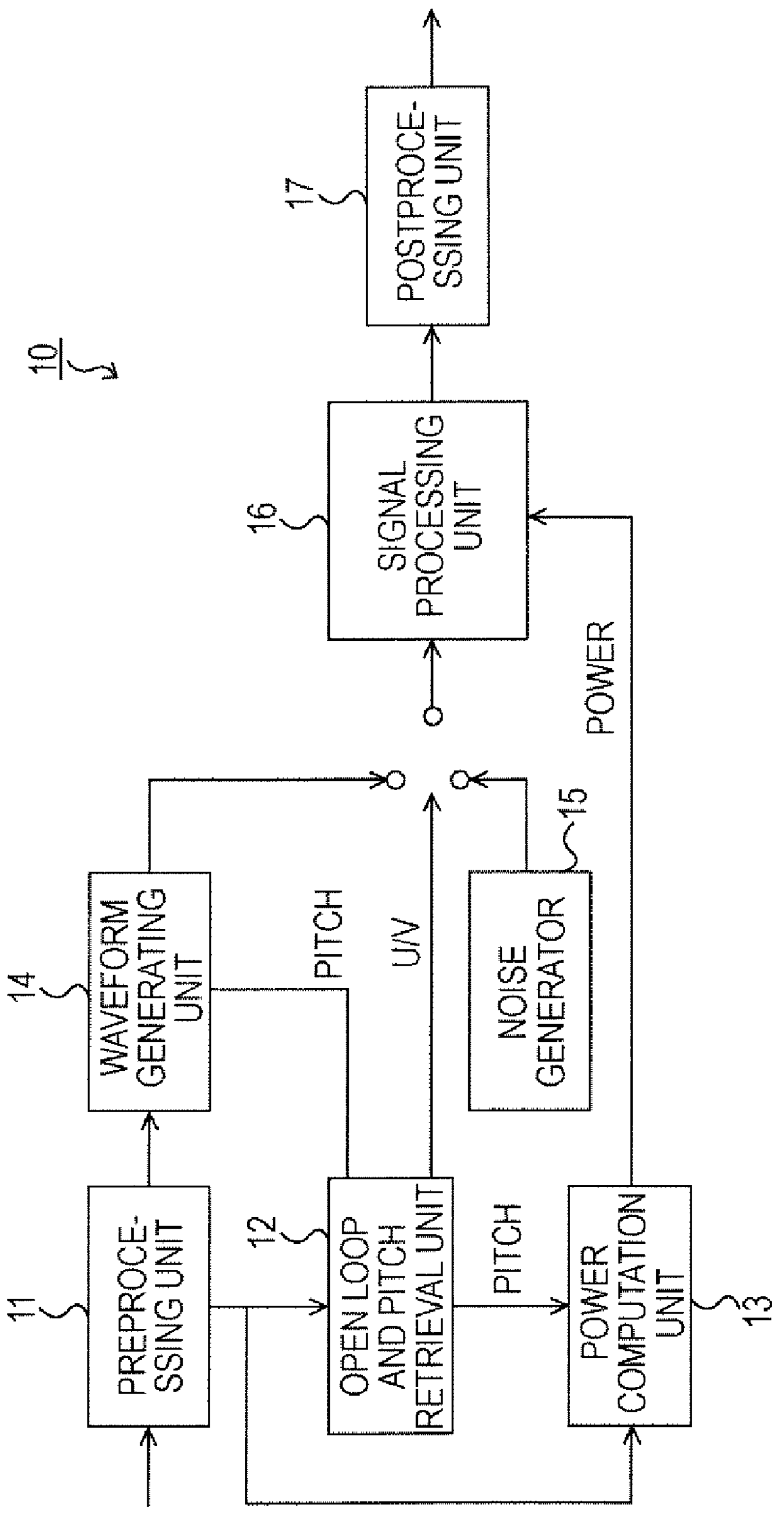
FIG. 1 is a block diagram showing a configuration of an audio signal interpolation apparatus according to an embodiment of the present invention.

FIG. 1 is a block diagram showing a configuration of an audio signal interpolation apparatus according to an embodiment of the present invention. An audio signal interpolation apparatus 10 processes subband signals (subframes) that have been obtained by dividing an original audio signal using, for example, a 16-band PQF (Polyphase Quadrature Filter). These subband signals are individually processed in the same manner.

The audio signal interpolation apparatus 10 is provided with a preprocessing unit 11 for performing preprocessing upon an input subband signal x(n), an open loop and pitch retrieval unit 12 for retrieving a pitch period p from a waveform of a signal $x_{us}$(m) obtained by the preprocessing, a power computation unit 13 for computing signal power pow using the signal $x_{us}$(m) and the pitch period p, a waveform generating unit 14 for forming a signal waveform $x_{pc}$(n) using the signal $x_{us}$(m) and the pitch period p, a noise generator 15 for generating a noise signal $x_{ng}$(n), a signal processing unit 16 for performing power control processing, windowing, and overlap processing upon the signal waveform $x_{pc}$(n) and/or the noise signal $x_{ng}$(n), and a postprocessing unit 17 for performing postprocessing upon a signal $x_w$(n) that has undergone the signal processing in the signal processing unit 16.

The preprocessing unit 11 performs preprocessing (described later) upon the input subband signal x(n). The signal $x_{us}$(m) preprocessed by the preprocessing unit 11 is output to the open loop and pitch retrieval unit 12, and the pitch period p is calculated therein on the basis of the signal $x_{us}$(m) The pitch period p and the signal $x_{us}$(m) are output to the power computation unit 13, and the signal power pow is calculated therein on the basis of the pitch period p and the signal $x_{us}$(m).

Here, if it is determined that signals preceding and/or following an interpolation segment are periodic signals, the signal waveform $x_{pc}$(n) is formed by the waveform generating unit 14. If it is determined that the preceding and/or following signals are noise signals, the noise generator 15 generates the noise signal $x_{ng}$(n).

The formed signal waveform $x_{pc}$(n) and the generated noise signal $x_{ng}$(n) are output to the signal processing unit 16, and are then subjected to power processing, windowing, overlap processing, etc. That is, the signal processing unit 16 optimizes signal power on the basis of the signal power pow of the preceding and/or following signals which has been calculated by the power computation unit 13. A signal $x_{ps}$(n) obtained by the signal power optimization is multiplied by a window function and is then subjected to the overlap processing. The signal $x_w$(n) that has undergone the windowing and the overlap processing is output to the postprocessing unit 17, and is then subjected to the postprocessing therein. Subsequently, an output signal y(n) is output from the postprocessing unit 17.

In the following, processing performed by each component will be described in detail.

In order to obtain an accurate pitch period, the preprocessing unit 11 removes a DC component from the input subband signal x(n) at a time n (in a subframe). This removal of the DC component is performed by removing an average value of subband signals from the input subband signal x(n).

$$DC = \frac{\sum_{n=0}^{N-1} x(n)}{N} \tag{1}$$

$$x_{rd}(n) = x(n) - DC \quad n = 0, \ldots, N-1 \tag{2}$$

where N denotes the length of a signal to be formed.

Furthermore, the preprocessing unit 11 divides the input subband signal x(n) into four signals by performing PQF filtering. A sampling interval of the four signals is 16 times as long as that of the original audio signal. For example, if the sampling frequency of the original audio signal is 44.1 kHz, the sampling interval of the signals becomes 1000.0/(44100/16)=0.36 ms.

That is, in order to obtain an accurate pitch period, a subband signal $x_{rd}(n)$, which is obtained by removing a DC component from the input subband signal x(n), is further divided into four signals each of which is represented by $x'_{rd}(m)$. Accordingly, a sampling interval of the signal $x'_{rd}(m)$ becomes 0.09 ms.

Here, the signal $x_{rd}(n)$ is obtained by multiplying the signal $x'_{rd}(m)$ by zero or four.

$$x'_{rd}(m) = \begin{cases} 4 \cdot & x_{rd}(m/4) \\ 0 & \text{others} \end{cases} \tag{3}$$

$$m = n * 4,\ n = 0, \ldots, N-1$$

$$M = 4N,\ m = 0, \ldots, M-1$$

For example, a low-pass filter has an optimized transmission frequency region 0.125π and an impulse response h(n). The signal $x_{us}(m)$ that has undergone upsampling in the preprocessing unit 11 is represented by the following equation.

$$x_{us}(m) = x_{rd}'(m) \otimes h(m) \tag{4}$$

The upsampled signal $x_{us}(m)$ is output to the open loop and pitch retrieval unit 12.

The open loop and patch retrieval unit 12 retrieves the pitch period p from the signal $x_{us}(m)$ upsampled by the preprocessing unit 11. There are several pitch retrieval methods such as the cross-correlation maximization method and the short-time AMDF (Average Magnitude Difference Function) method. In this case, the maximization method compliant with ITU-T G.723.1 is used. In this maximization method, the pitch period p is determined by using a cross-correlation $C_{OL}(j)$ represented by the following equation as an evaluation value.

$$C_{OL}(j) = \frac{\left(\sum_{m=MaxPitch}^{M-1} x_{us}(m) \cdot x_{us}(m-j)\right)^2}{\sum_{m=MaxPitch}^{M-1} x_{us}(m-j) \cdot x_{us}(m-j)} \tag{5}$$

$$MinPitch \le j \le MaxPitch$$

Here, an index j allowing the cross-correlation $C_{OL}(j)$ to be the maximum is obtained from the audio signal as an estimated pitch period. In the retrieval of the optimum index j, in order to prevent the occurrence of a pitch multiple error, a pitch period having a smaller value is assigned a higher priority.

Figure 2:
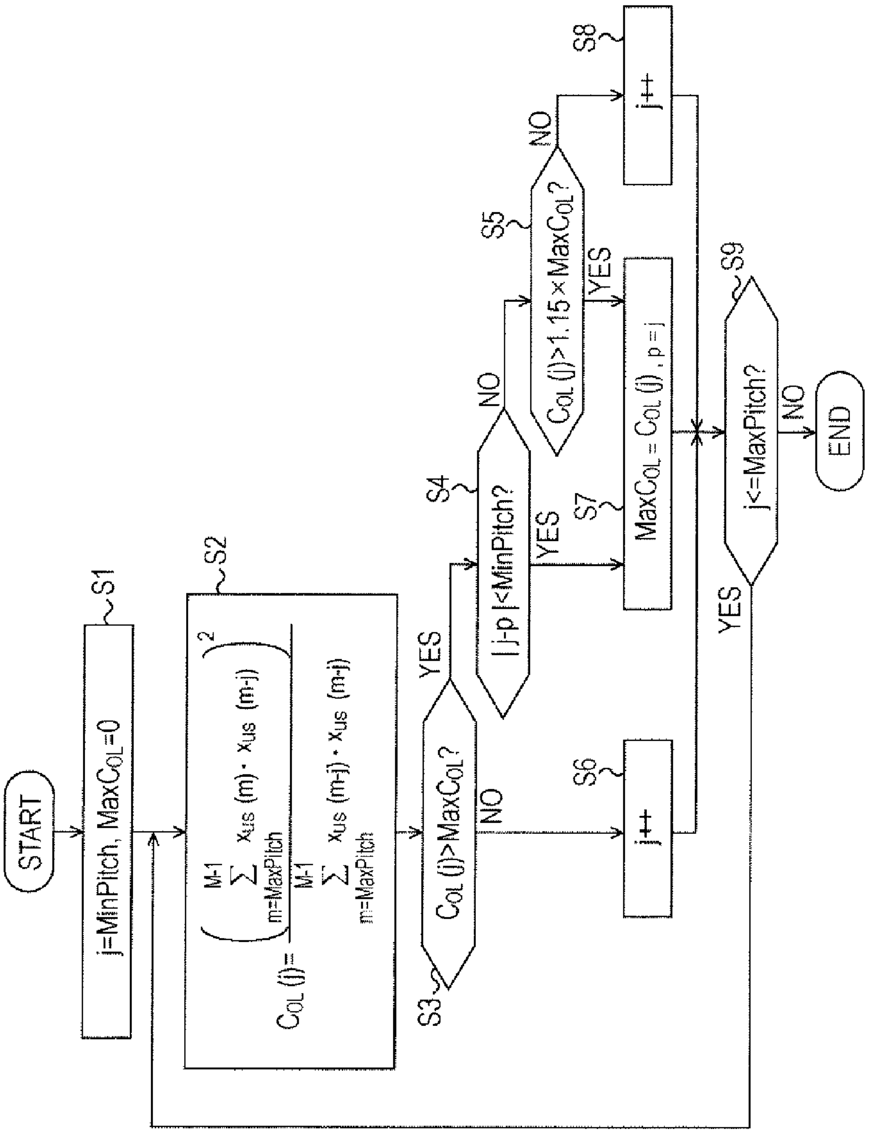
FIG. 2 is a flowchart showing an open loop and pitch retrieval process.

FIG. 2 is a flowchart showing an open loop and pitch retrieval process. The retrieval of the cross-correlation $C_{OL}(j)$ having the maximum value starts from j=MinPitch in step S1. In step S2, the cross-correlation $C_{OL}(j)$ is calculated. In step S3 to step S5, the cross-correlation $C_{OL}(j)$ having the maximum value detected by the retrieval is compared with an optimum maximum value $MaxC_{OL}$ obtained immediately before.

In step S3, if $C_{OL}(j)>MaxC_{OL}$, the process proceeds to step S4. On the other hand, if $C_{OL}(j) \leqq MaxC_{OL}$ in step S3, the process proceeds to step S6 in which the index j is incremented. In step S4, if |j−p|<MinPitch, the process proceeds to step S7 in which $C_{OL}(j)$ i s set as a new maximum value. On the other hand, if |j−p|≧MinPitch in step S4, the process proceeds to step S5. In step S5, if $C_{OL}(j)>1.15\times MaxC_{OL}$, the process proceeds to step S7 in which $C_{OL}(j)$ is set as a new maximum value. On the other hand, if $C_{OL}(j) \leqq 1.15\times MaxC_{OL}$ in step S5, the process proceeds to step S8 in which the index j is incremented.

Thus, if a difference between the index j and an index p for the optimum maximum value $MaxC_{OL}$ is smaller than MinPitch, and if $C_{OL}(j)>MaxC_{OL}$, $C_{OL}(j)$ is selected as a new maximum value. In addition, if the difference between the two indexes is equal to or larger than MinPitch, and if $C_{OL}(j)>1.15\times MaxC_{OL}$, $C_{OL}(j)$ is also selected as a new maximum value.

The above-described open loop and pitch retrieval process is repeated until the index j has become MaxPitch (step S9).

It is desirable that the value of MinPitch be set to 16 and the value of MaxPitch be set to 216. These values of MinPitch and MaxPitch correspond to the maximum pitch frequency 689 Hz and the minimum pitch frequency 51 Hz, respectively.

Upon acquiring the pitch period p, the open loop and pitch retrieval unit 12 determines whether the received signal is a periodic signal or a noise signal on the basis of the acquired pitch period p. Here, if the value of the optimum maximum value $MaxC_{OL}$ is smaller than 0.7, it is determined that the received signal is a noise signal. If the value of the optimum maximum value $MaxC_{OL}$ is equal to or larger than 0.7, it is determined that the received signal is a periodic signal.

Figure 3:
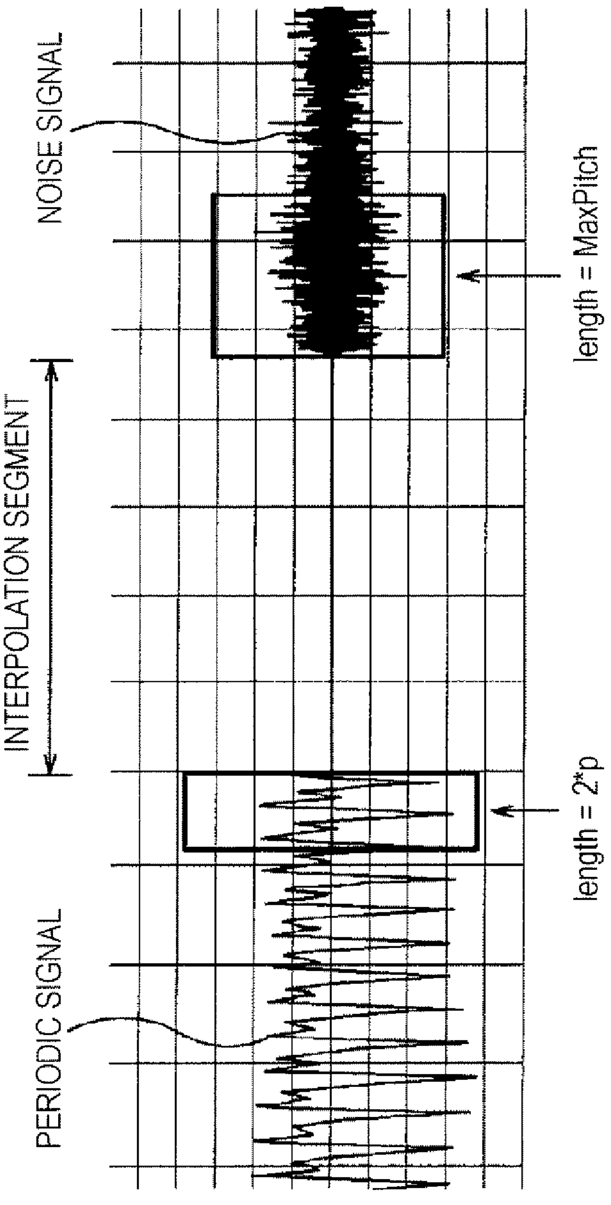
FIG. 3 is a schematic diagram showing exemplary signals adjacent to an interpolation segment.

The power computation unit 13 computes power of signals preceding and/or following the interpolation segment on the basis of the pitch period p retrieved by the open loop and pitch retrieval unit 12, and calculates power of a signal in the interpolation segment using the computed power of the signals preceding and/or following the interpolation segment. Here, as shown in FIG. 3, if a signal adjacent to the interpolation segment is a periodic signal, power $pow_p$ of a signal in the interpolation segment is calculated using a sample 2P adjacent to the interpolation segment. In addition, as shown in FIG. 3, if a signal adjacent to the interpolation segment is a noise signal, power $pow_n$ of a signal in the interpolation segment is calculated using a sample that has a sample length of MaxPitch and is adjacent to the interpolation segment.

$$pow_p = \frac{\sum_{m=M-1-2p}^{M-1} x_{us}(m) \cdot x_{us}(m)}{2p} \tag{6}$$

$$pow_n = \frac{\sum_{m=M-1-MaxPitch}^{M-1} x_{us}(m) \cdot x_{us}(m)}{MaxPitch} \tag{7}$$

The waveform generating unit 14 forms a waveform for the interpolation segment on the basis of the pitch periods and power of the signals preceding and/or following the interpolation segment. The waveform generating unit 14 forms a periodic signal.

First, the waveform generating unit 14 forms a waveform for the interpolation segment using a signal waveform $x_{usf}(m)$ of the preceding signal and a signal waveform $x_{usb}(m)$ of the following signal, that is, waveforms in two directions. More specifically, the waveform generating unit 14 calculates the following equations using a pitch $ptmp_f$ of the preceding signal and a pitch $ptmp_b$ of the following signal which have been calculated by the open loop and pitch retrieval unit 12.

$$p_{\Delta f} = \frac{p_b - p_f}{M},\ ptmp_f = p_f + p_{\Delta f} \cdot m \quad m = 0, \ldots, M-1 \tag{8}$$

$$p_{\Delta b} = \frac{p_f - p_b}{M},\ ptmp_b = p_b + p_{\Delta b} \cdot m \quad m = 0, \ldots, M-1 \tag{9}$$

where $p_f$ and $p_b$ denote pitches calculated on the basis of the pitches of the preceding and following signals, respectively.

Figure 4:
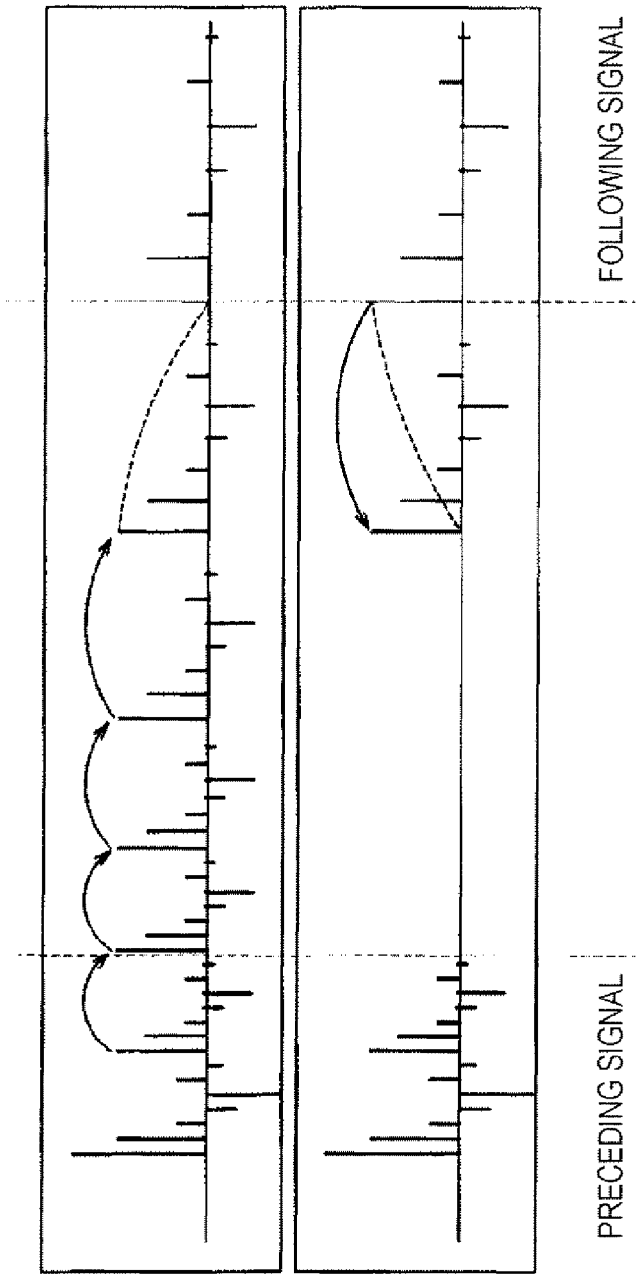
FIG. 4 is a schematic diagram showing a state in which pitches are obtained in an interpolation segment by performing extrapolation using a pitch of a preceding signal.

FIG. 4 is a schematic diagram showing a state in which pitches are obtained in the interpolation segment by performing extrapolation using the pitch of the preceding signal. Here, in a one-pitch segment on the side of the following signal in the interpolation segment, the amplitude of the pitch obtained by the above-described extrapolation and the amplitude of the pitch of the following signal are cross-faded as represented by dotted lines.

Figure 5:
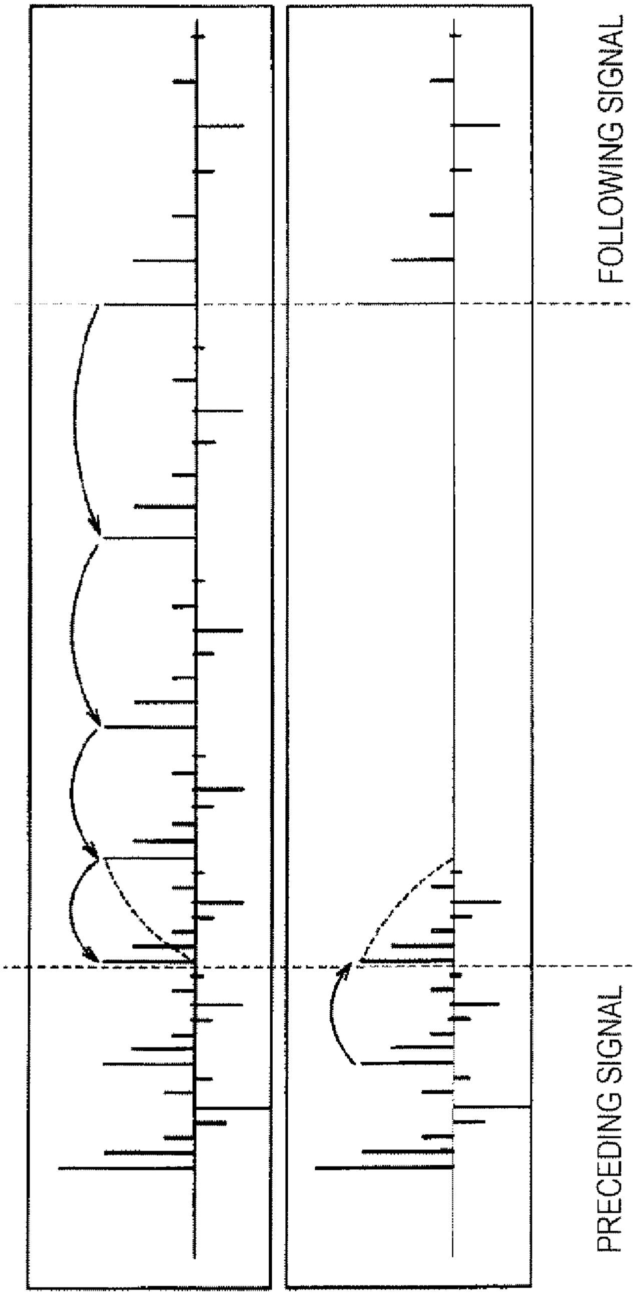
FIG. 5 is a schematic diagram showing a state in which pitches are obtained in an interpolation segment by performing extrapolation using a pitch of a following signal.

FIG. 5 is a schematic diagram showing a state in which pitches are obtained in the interpolation segment by performing extrapolation using the pitch of the following signal. Here, in a one-pitch segment on the side of the preceding signal in the interpolation segment, the amplitude of the pitch obtained by the above-described extrapolation and the amplitude of the pitch of the preceding signal are cross-faded as represented by dotted lines. Thus, in a one-pitch segment, amplitudes are cross-faded, whereby nonlinearity can be increased.

A signal waveform $x_{pcf}(m)$ formed using the preceding signal and a signal waveform $x_{pcb}(m)$ formed using the following signal are represented by the following equations.

$$x_{pcf}(m) = \begin{cases} x_{usf}(M+m) & m = -MaxPitch, \ldots, -1 \\ x_{pcf}(m - ptmp_f) & m = 0, \ldots, M-1 \end{cases} \tag{10}$$

$$x_{pcb}(m) = \begin{cases} x_{usb}(m-M) & m = M + MaxPitch - 1, \ldots, M \\ x_{pcb}(m + ptmp_b) & m = M-1, \ldots, 0 \end{cases} \tag{11}$$

Here, if the power of the following signal is larger than that of the preceding signal, as shown in FIG. 5, it is desirable that a signal waveform be formed by performing extrapolation using the pitch of the following signal.

$$p_{\Delta b} = \frac{p_f - p_b}{M},\ ptmp_b = p_b + p_{\Delta b} \cdot m \quad m = 0, \ldots, M-1 \tag{12}$$

$$x_{pcb}(m) = \begin{cases} x_{usb}(m-M) & m = M + MaxPitch - 1, \ldots, M \\ x_{pcb}(m + ptmp_b) & m = M-1, \ldots, 0 \end{cases} \tag{13}$$

$$x_{pcf}(m) = x_{usf}(M + m - p_f) \quad m = 0, \ldots, p_f - 1 \tag{14}$$

If the power of the preceding signal is larger than that of the following signal, as shown in FIG. 4, a signal waveform for the interpolation segment is similarly formed on the basis of the preceding signal. The signal waveform $x_{pcf}(m)$ formed using the preceding signal and the signal waveform $x_{pcb}(m)$ formed using the following signal are buffered.

If the preceding and/or following signals are determined to be noise signals, unlike the processing performed by the waveform generating unit 14, a signal for the interpolation segment is generated by the noise generator 15. The generated signal is represented by equation (15).

$$x_{ng}(m) = \text{rand}(\,)\ m = 0, \ldots, M-1 \tag{15}$$

The processing performed on a noise signal that is a high-frequency component will be described later.

After the signal waveform formation processing performed by the waveform generating unit 14 or the signal generation processing performed by the noise generator 15 has been completed, the signal processing unit 16 controls power of the interpolation segment on the basis of the signals adjacent to the interpolation segment. This power control processing is performed using a nonlinear model that is selected on the basis of the power of the preceding and/or following signals computed by the power computation unit 13. It is desirable that a nonlinear curve of the nonlinear model be selected from among several candidates stored in a storage unit (not shown) in advance.

Figure 6:
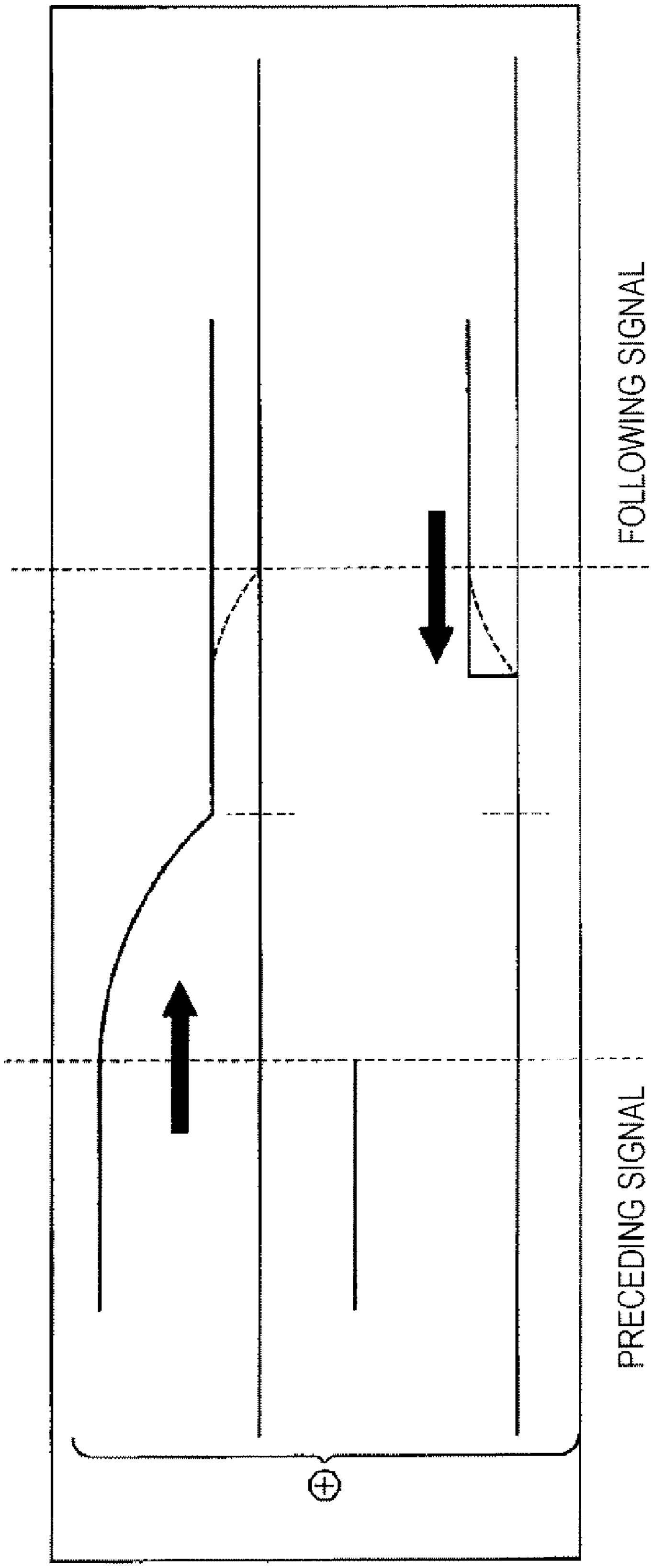
FIG. 6 is a schematic diagram showing power control processing performed when power of a preceding signal is larger than that of a following signal.

FIG. 6 is a schematic diagram showing power control processing performed when the power of the preceding signal is larger than that of the following signal. Here, in order to obtain natural sound quality, nonlinear interpolation is performed using the power of the preceding and following signals instead of linear interpolation. In an example shown in FIG. 6, a sine curve is used in a power decreasing portion in the interpolation segment. In a portion posterior to the middle of the interpolation segment, the same power as that of the following signal is maintained.

The total power of the interpolation segment is represented by equation (16). Furthermore, signal waveforms formed on the basis of the power of the preceding signal and the power of the following signal are represented by equations (17) and (18), respectively.

$$ps_d(m) = \begin{cases} pow_b + (pow_f - pow_b) \cdot \cos\left(\frac{\pi \cdot m}{M}\right) & m = 0, \ldots, M/2-1 \\ pow_b & m = M/2, \ldots, M-1 \end{cases} \tag{16}$$

$$x_{psf}(m) = x_{pcf/ngf}(m) \cdot ps_d(m) \quad m = 0, \ldots, M-1 \tag{17}$$

$$x_{psb}(m) = x_{pcb/ngb}(m) \quad m = 0, \ldots, p_b - 1 \tag{18}$$

Figure 7:
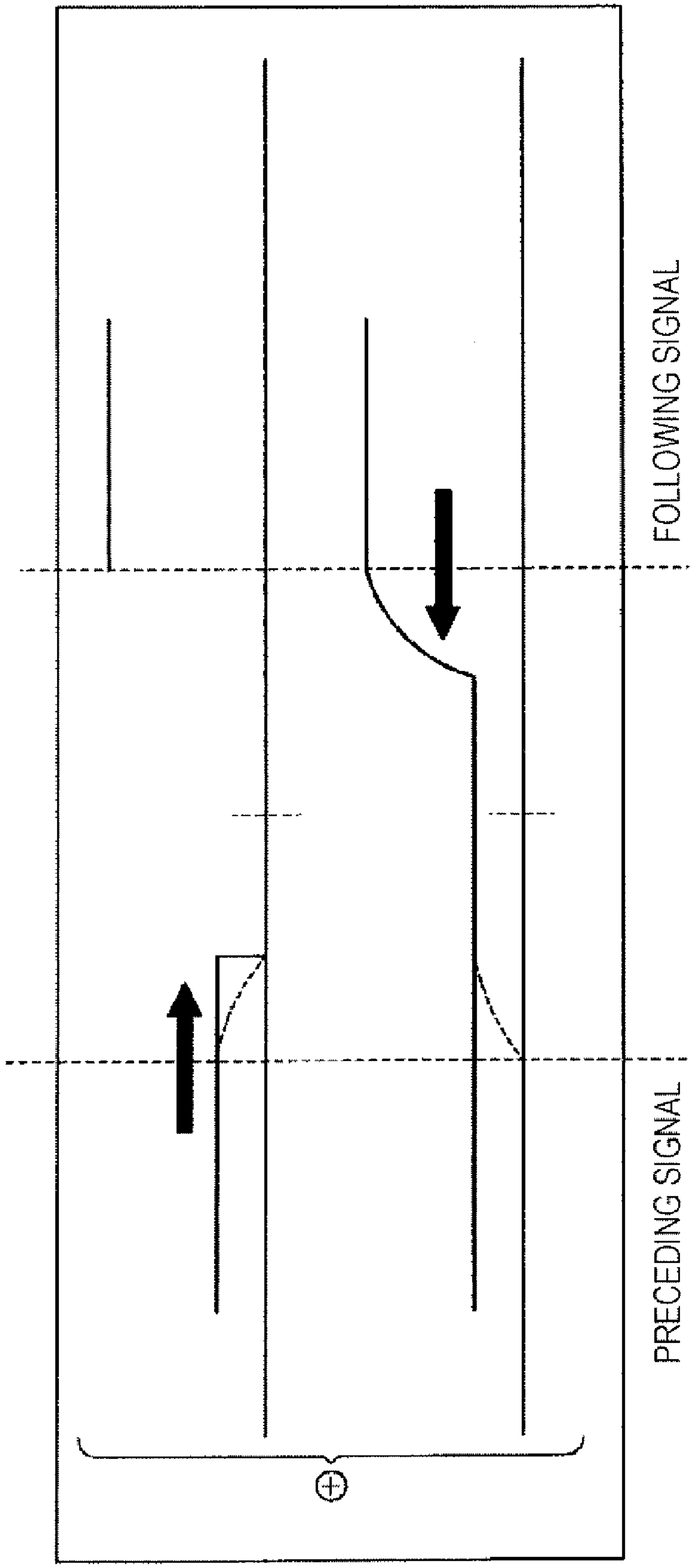
FIG. 7 is a schematic diagram showing power control processing performed when power of a preceding signal is smaller than that of a following signal.

FIG. 7 is a schematic diagram showing power control processing performed when the power of the preceding signal is smaller than that of the following signal. Here, in order to obtain natural sound quality, nonlinear interpolation is performed using the power of the preceding and following signals instead of linear interpolation. In an example shown in FIG. 7, a sine curve is used in a power increasing portion in the interpolation segment whose length is one quarter that of the interpolation segment. In a portion anterior to the power increasing portion, the same power as that of the preceding signal is maintained.

The total power of the interpolation segment is represented by equation (19). Furthermore, waveforms formed on the basis of the power of the preceding signal and the power of the following signal are represented by equations (20) and (21), respectively.

$$ps_u(m) = \begin{cases} pow_f & m = 0, \ldots, 3M/4-1 \\ pow_f + (pow_b - pow_f) \cdot \sin\left(\frac{2\pi \cdot (m - 3M/4)}{M}\right) & m = 3M/4, \ldots, M-1 \end{cases} \tag{19}$$

$$x_{psf}(m) = x_{pcf/ngf}(m) \quad m = 0, \ldots, p_f - 1 \tag{20}$$

$$x_{psb}(m) = x_{pcb/ngb}(m) \cdot ps_u(m) \quad m = 0, \ldots, M-1 \tag{21}$$

Thus, power control is performed using a nonlinear model. Accordingly, in the power decreasing portion, the power level can be gradually decreased. On the other hand, in the power increasing portion, the power level can be sharply increased. Consequently, natural sound quality can be obtained.

Subsequently, windowing and overlap processing are performed upon a signal $x_{wf}$ in the interpolation segment whose power has been controlled on the basis of the power of the preceding signal and a signal $x_{wb}$ in the interpolation segment whose power has been controlled on the basis of the power of the following signal so as to obtain the reconstructed signal $x_w(m)$.

The overlap method varies according to the types of the preceding and following signals classified by the open loop and pitch retrieval unit 12.

If the preceding and following signals are periodic signals, the signal $x_{wf}$ in the interpolation segment which has been generated on the basis of the preceding signal is represented by equation (23) in which a window function represented by equation (22) is used. Similarly, the signal $x_{wb}$ in the interpolation segment which has been generated on the basis of the following signal is represented by equation (25) in which a window function represented by equation (24) is used.

$$w_f(m) = \cos\left(\frac{\pi \cdot m}{2 \cdot p_b}\right) \quad m = 0, \ldots, p_b - 1 \tag{22}$$

$$x_{wf}(m) = \begin{cases} x_{psf}(m) & m = 0, \ldots, M - p_b - 1 \\ x_{psb}(m-(M-p_b)) \cdot (1 - w_f^2(m-(M-p_b))) + \\ x_{psf}(m) \cdot w_f^2(m-(M-p_b)) & m = M - p_b, \ldots, M - 1 \end{cases} \tag{23}$$

$$w_b(m) = \cos\left(\frac{\pi \cdot m}{2 \cdot p_f}\right) \quad m = 0, \ldots, p_b - 1 \tag{24}$$

$$x_{wb}(m) = \begin{cases} x_{psf}(m) \cdot w_b^2(m) + x_{psb}(m) \cdot (1 - w_b^2(m)) & m = 0, \ldots, p_f - 1 \\ X_{psb}(m) & m = p_f, \ldots, M - 1 \end{cases} \tag{25}$$

Here, if the power of the preceding signal is larger than that of the following signal, as shown in FIG. 6, the power of the preceding signal and the power of the following signal overlap each other in a portion on the side of the following signal in the interpolation segment. In addition, if the power of the preceding signal is smaller than that of the following signal, as shown in FIG. 7, the power of the preceding signal and the power of the following signal overlap each other in a portion on the side of the preceding signal in the interpolation segment.

If the preceding signal is a noise signal and the following signal is a periodic signal, a pitch period is set so that $p_f$=MaxPitch can be satisfied and the above-described method is similarly performed.

If the following signal is a noise signal and the preceding signal is a periodic signal, a pitch period is set so that $p_b$=MaxPitch can be satisfied and the above-described method is similarly performed.

If both of the preceding and following signals are noise signals, the preceding signal and the following signal are represented by equations (26) and (27), respectively.

$$x_{wf}(m)=x_{psf}(m) \quad m=0, \ldots, M-1 \tag{26}$$

$$x_{wb}(m)=x_{psb}(m) \quad m=0, \ldots, M-1 \tag{27}$$

After the overlap processing has been performed in the signal processing unit 16, the reconstructed signal $x_w(m)$ is output to the postprocessing unit 17.

The postprocessing unit 17 processes the signal $x_w(m)$ by reversing the procedure performed by the preprocessing unit 11. That is, the postprocessing unit 17 adds the removed DC component to the signal $x_w(m)$, and performs downsampling upon all the four divided signals so as to reconstruct the subband signal y(n).

$$DC_{\Delta f} = \frac{DC_b - DC_f}{M}, \tag{28}$$

$$DCtmp_f = DC_f + DC_{\Delta f} \cdot m \quad m = 0, \ldots, M - 1$$

$$y(n) = x_w(m) + DCtmp_f \quad m = 4n, \quad n = 0, \ldots, N - 1 \tag{29}$$

where $DC_f$ and $DC_b$ denote DC components of the preceding and following signals, respectively.

Thus, a waveform for a predetermined segment is formed on the basis of time-domain samples of audio signals preceding and/or following the predetermined segment. Power of the formed waveform for the predetermined segment is non-linearly controlled on the basis of power of the preceding and/or following audio signals. Consequently, an audio signal in the predetermined segment is generated. By performing the above-described process, a natural sound quality can be obtained.

Next, an audio signal interpolation method according to an embodiment of the present invention will be described with reference to FIG. 8 to FIG. 19. FIG. 8 to FIG. 11 are schematic diagrams describing interpolation processing performed when the preceding and following signals are periodic signals. FIG. 12 to FIG. 15 are schematic diagrams describing interpolation processing performed when the preceding signal is a periodic signal and the following signal is a silent signal. FIG. 16 to FIG. 19 are schematic diagrams describing interpolation processing performed when the preceding signal is a silent signal and the following signal is a periodic signal.

Figure 8:
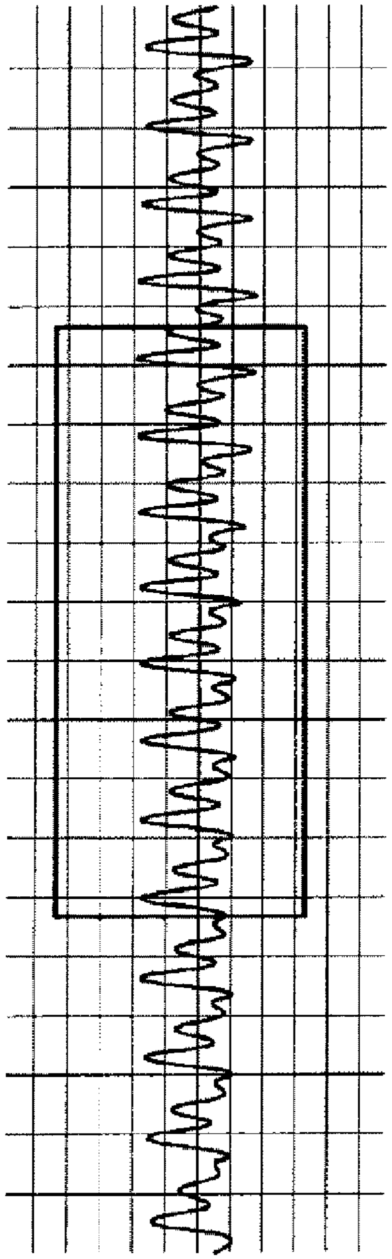
FIG. 8 is a schematic diagram describing interpolation processing performed when preceding and following signals are periodic signals.
Figure 9:
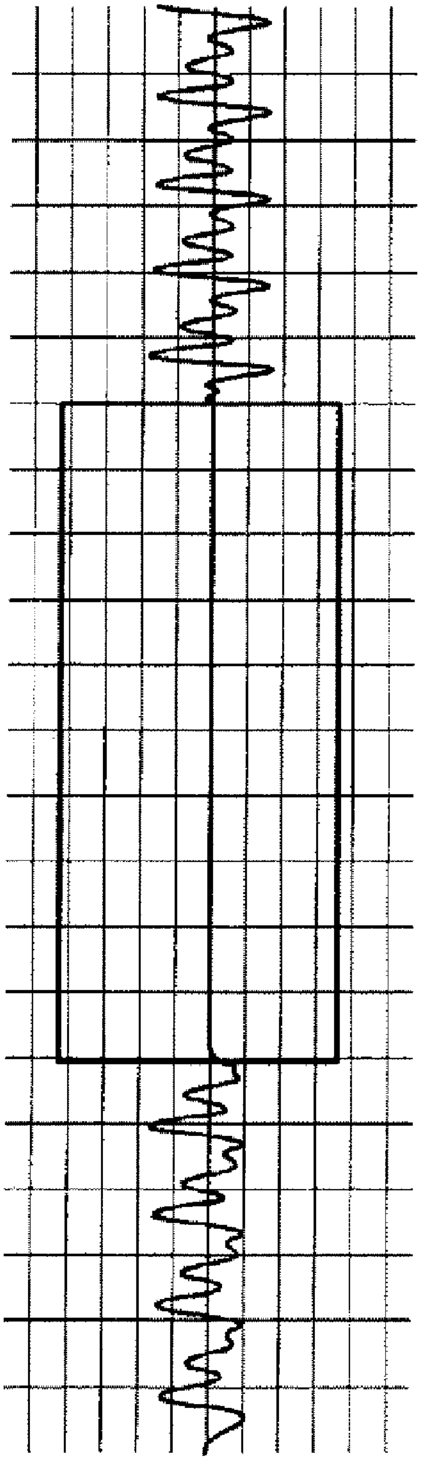
FIG. 9 is a schematic diagram describing interpolation processing performed when preceding and following signals are periodic signals.
Figure 10:
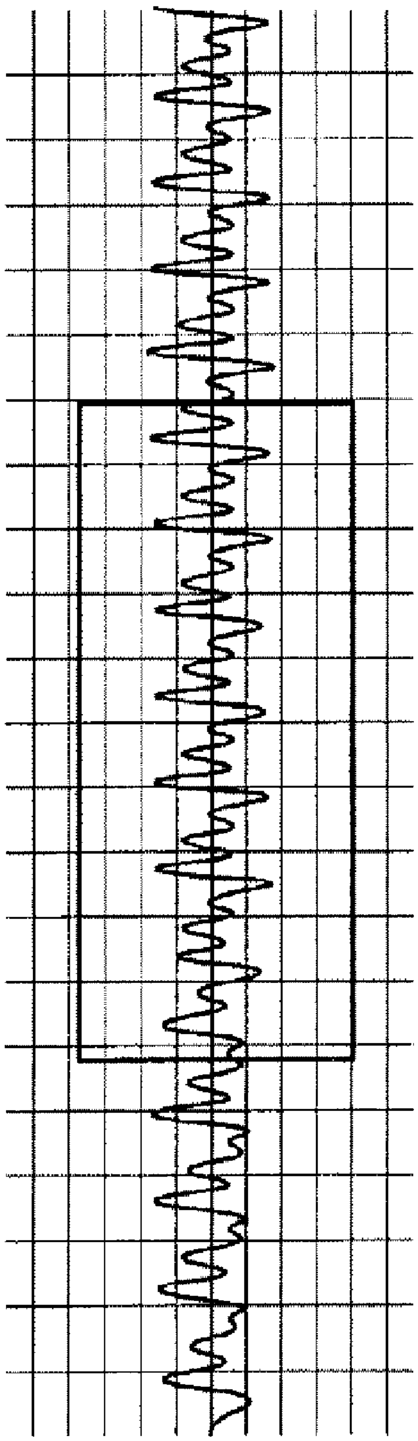
FIG. 10 is a schematic diagram showing a signal waveform obtained by interpolation processing according to an embodiment of the present invention performed when preceding and following signals are periodic signals.
Figure 11:
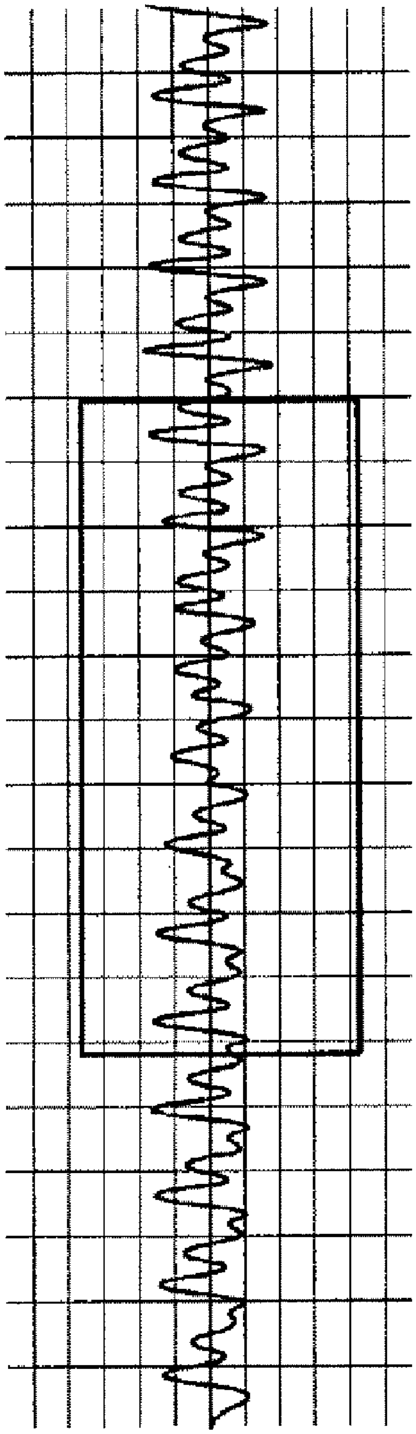
FIG. 11 is a schematic diagram showing a signal waveform obtained by known interpolation processing performed when preceding and following signals are periodic signals.

For example, in a case where an original signal waveform shown in FIG. 8 is lost as shown in FIG. 9, if an audio signal interpolation method according to an embodiment of the present invention is used to reconstruct a missing portion, a signal waveform shown in FIG. 10 can be obtained. If the obtained signal waveform is compared with a signal waveform shown in FIG. 11 which is obtained under the same conditions using a known method, a decrease in power occurring near the middle of an interpolation segment in the waveform shown in FIG. 11 can be prevented in the waveform shown in FIG. 10. Furthermore, the signal waveform obtained by performing an audio signal interpolation method according to an embodiment of the present invention resembles the original signal waveform shown in FIG. 8 more than the signal waveform shown in FIG. 11.

Figure 12:
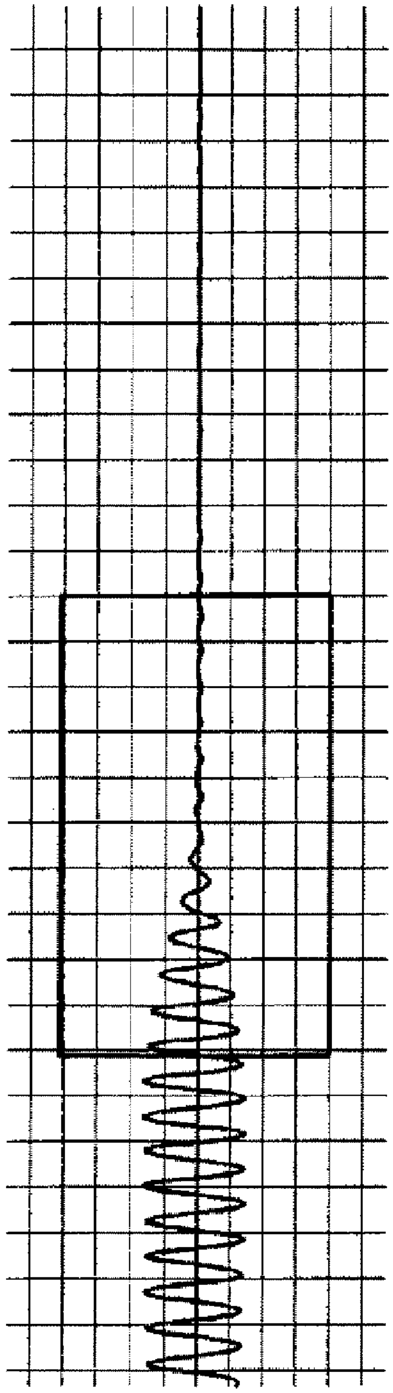
FIG. 12 is a schematic diagram describing interpolation processing performed when a preceding signal Is a periodic signal and a following signal is a silent signal.
Figure 13:
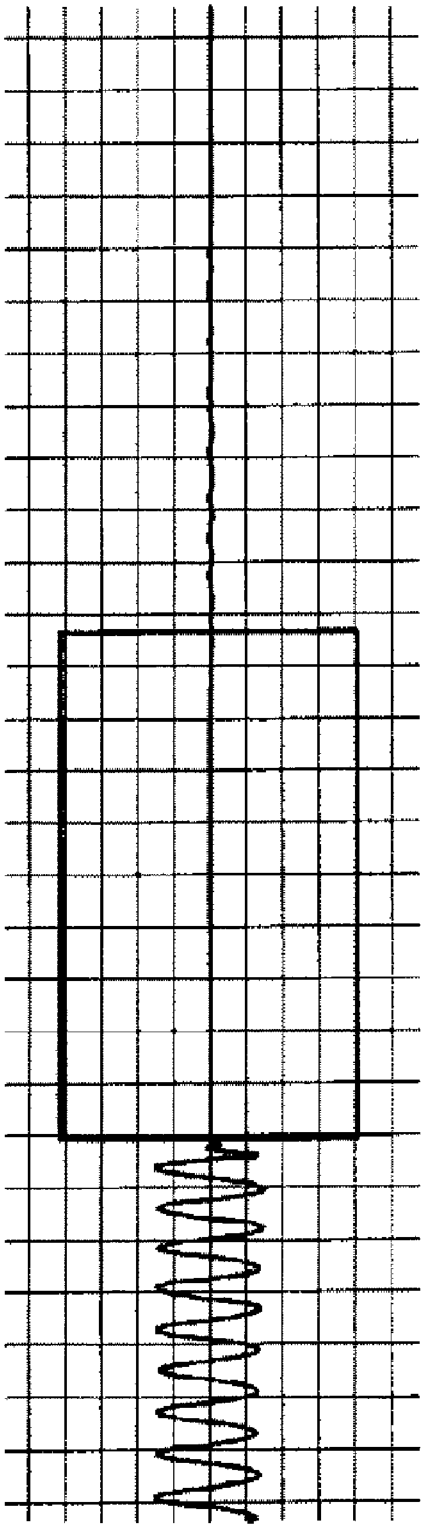
FIG. 13 is a schematic diagram describing interpolation processing performed when a preceding signal is a periodic signal and a following signal is a silent signal.
Figure 14:
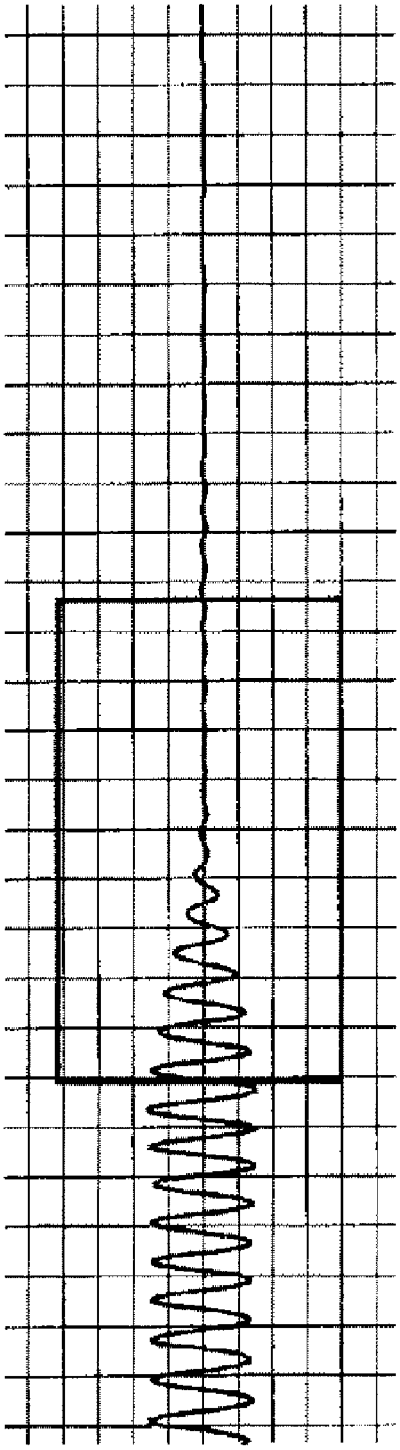
FIGS. 14 is a schematic diagram showing a signal waveform obtained by interpolation processing according to an embodiment of the present Invention performed when a preceding signal is a periodic signal and a following signal is a silent signal.
Figure 15:
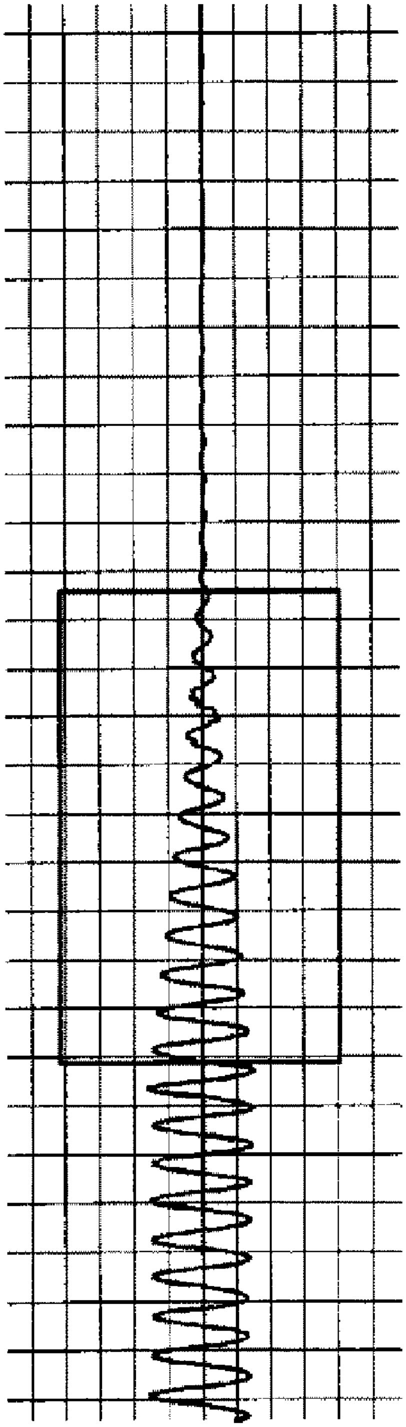
FIG. 15 is a schematic diagram showing a signal waveform obtained by known interpolation processing performed when a preceding signal is a periodic signal and a following signal is a silent signal.

For example, in a case where an original signal waveform shown in FIG. 12 is lost as shown in FIG. 13, if an audio signal interpolation method according to an embodiment of the present invention is used to reconstruct a missing portion, a signal waveform shown in FIG. 14 can be obtained. If the obtained signal waveform is compared with a signal waveform shown in FIG. 15 which is obtained under the same conditions using a known method, the signal waveform obtained by performing an audio signal interpolation method according to an embodiment of the present invention resembles the original signal waveform shown in FIG. 12 more than the signal waveform shown in FIG. 15, in particular, in a portion posterior to the middle of the interpolation segment.

Figure 16:
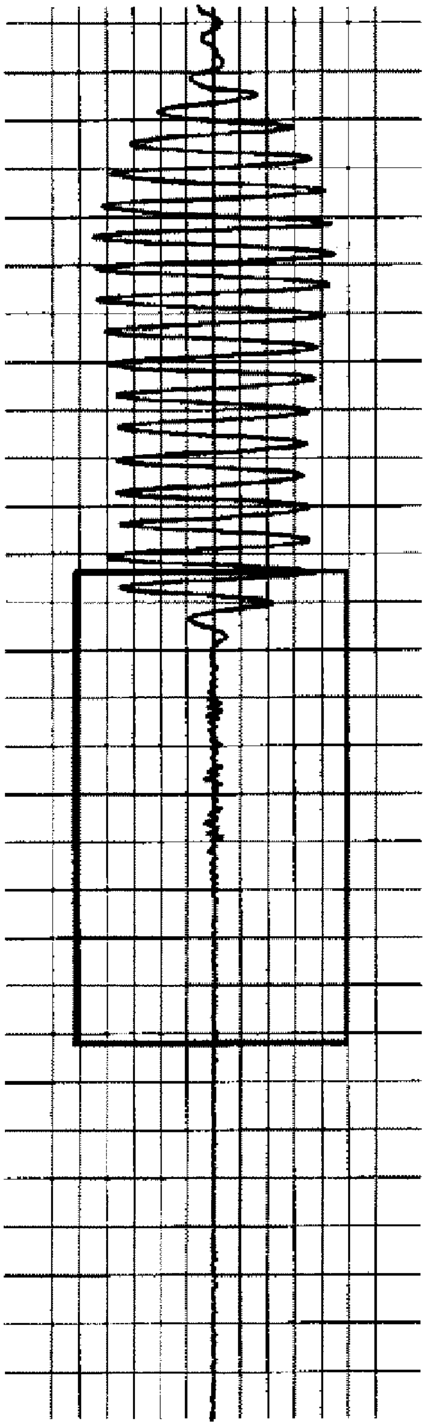
FIG. 16 is a schematic diagram describing interpolation processing performed when a preceding signal is a silent signal and a following signal is a periodic signal.
Figure 17:
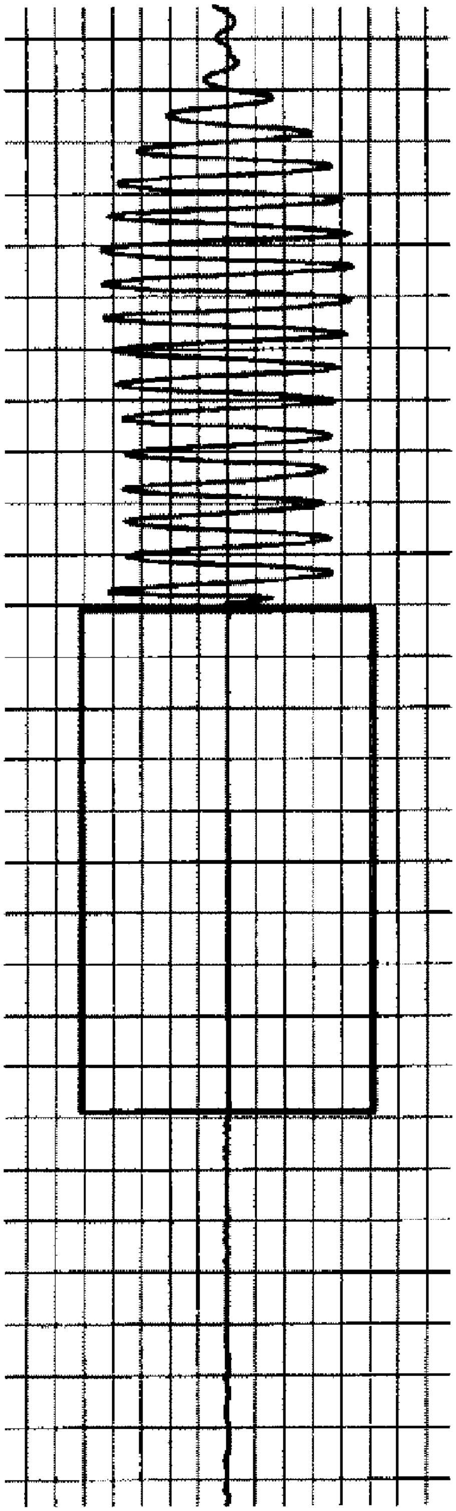
FIG. 17 is a schematic diagram describing interpolation processing performed when a preceding signal is a silent signal and a following signal is a periodic signal.
Figure 18:
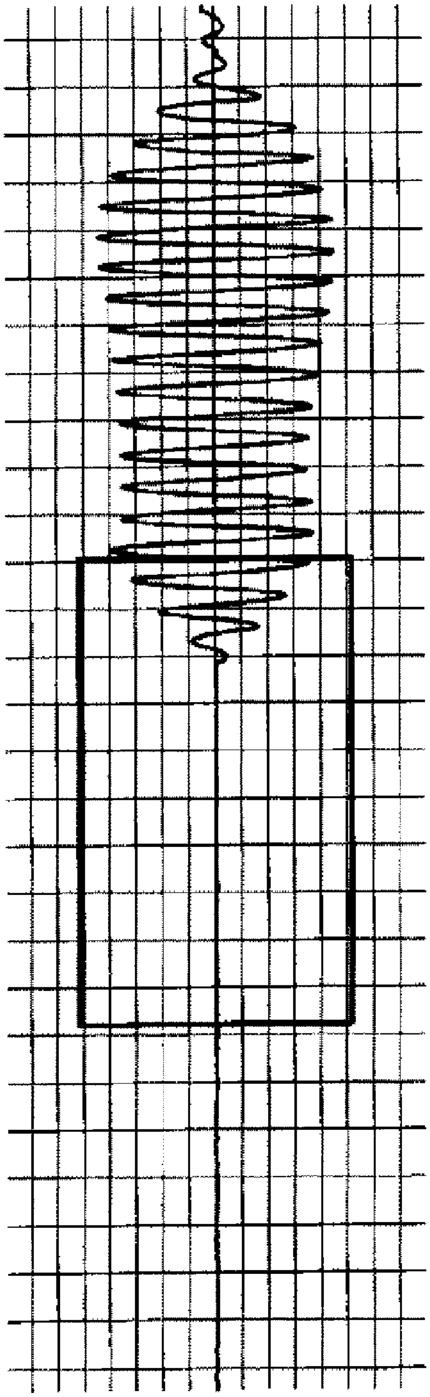
FIG. 18 is a schematic diagram showing a signal waveform obtained by interpolation processing according to an embodiment of the present invention performed when a preceding signal is a silent signal and a following signal is a periodic signal.
Figure 19:
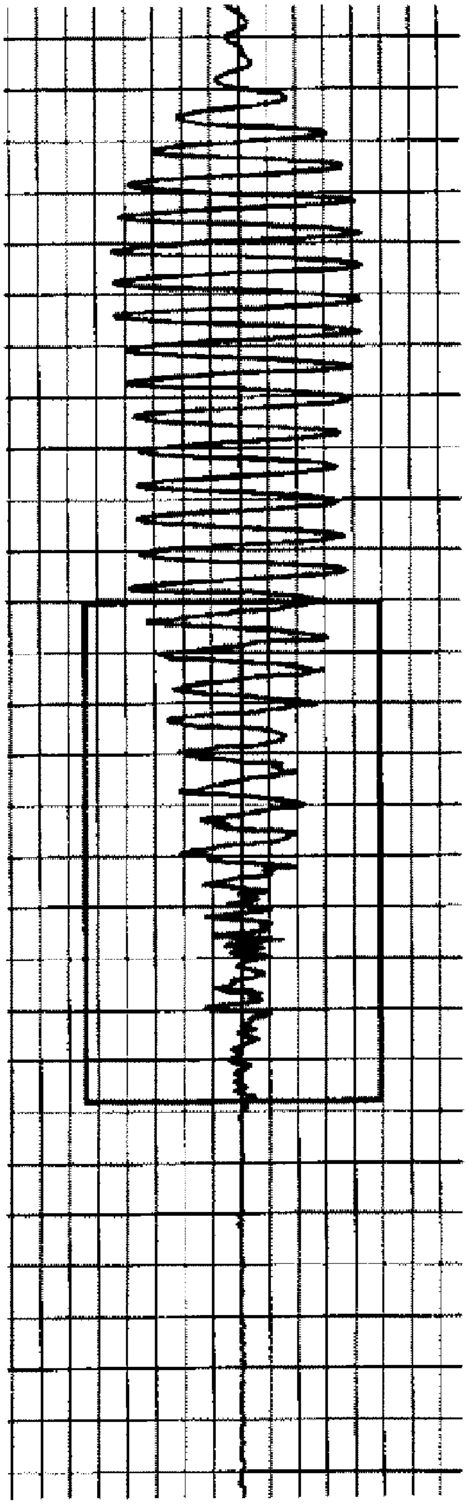
FIG. 19 is a schematic diagram showing a signal waveform obtained by known interpolation processing performed when a preceding signal is a silent signal and a following signal is a periodic signal.

For example, in a case where an original signal waveform shown in FIG. 16 is lost as shown in FIG. 17, if an audio signal interpolation method according to an embodiment of the present invention is used to reconstruct a missing portion, a signal waveform shown in FIG. 18 can be obtained. If the obtained signal waveform is compared with a signal waveform shown in FIG. 19 which is obtained under the same conditions using a known method, the signal waveform obtained by performing an audio signal interpolation method according to an embodiment of the present invention resembles the original signal waveform shown in FIG. 16 more than the signal waveform shown in FIG. 19, in particular, in a portion anterior to the middle of the interpolation segment.

Figure 20:
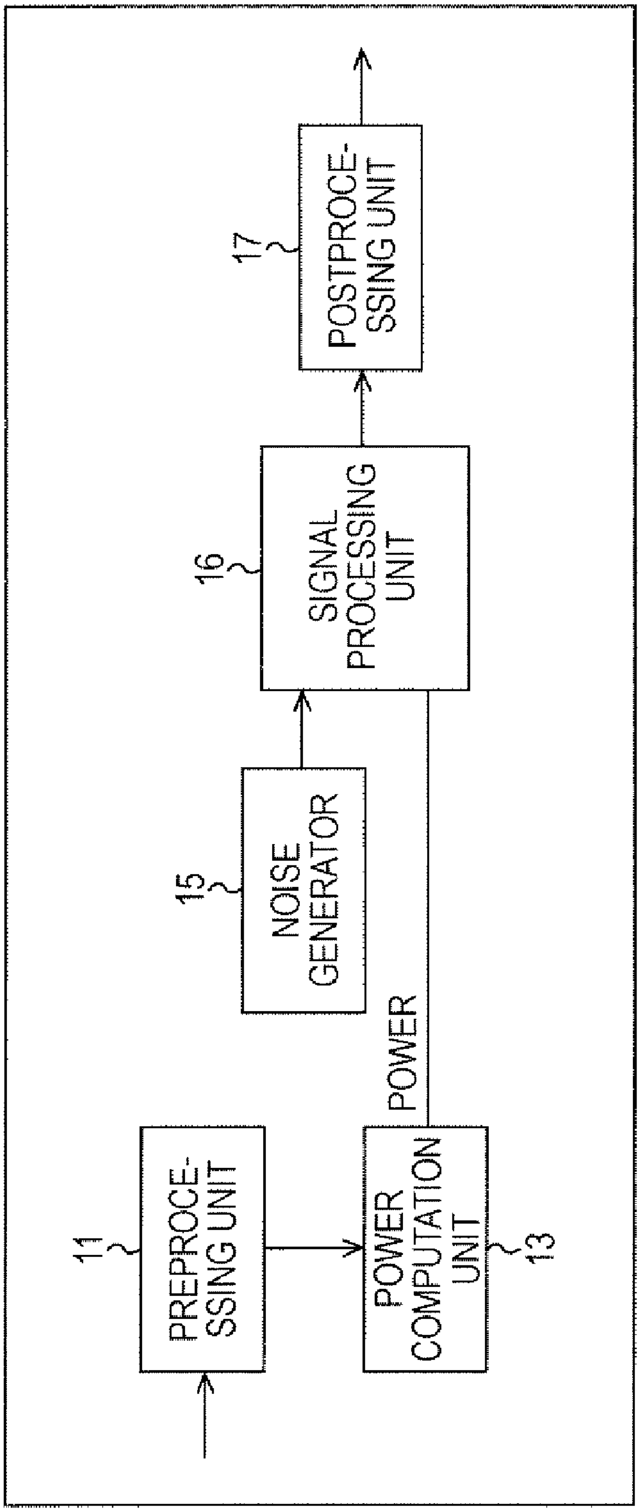
FIG. 20 is a block diagram showing a function of performing interpolation processing upon a high-frequency subband signal.
Figure 21A:
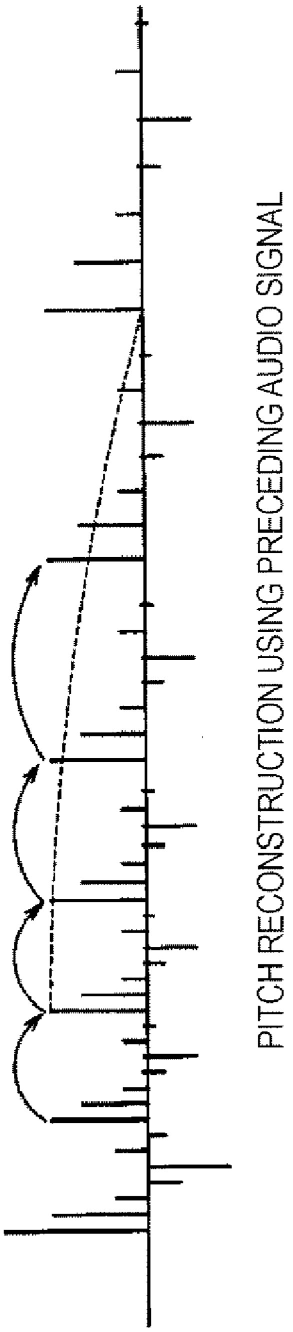
FIGS. 21A and 21B are schematic diagrams describing known signal interpolation processing.
Figure 21B:
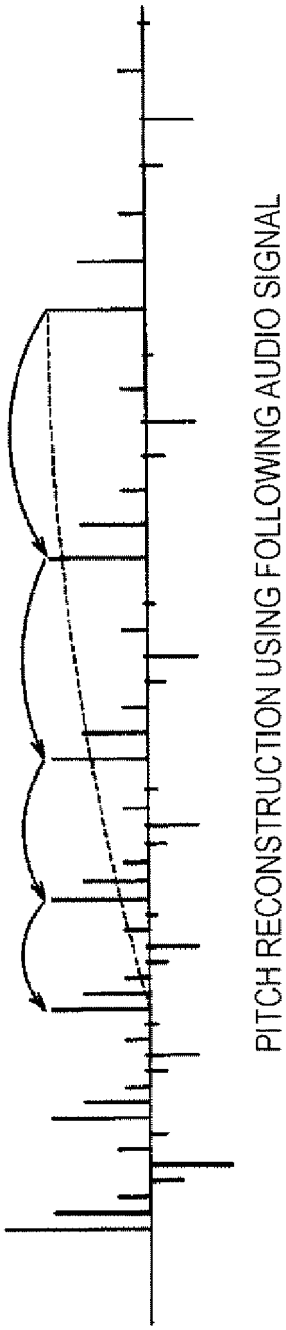
Figure 22A:
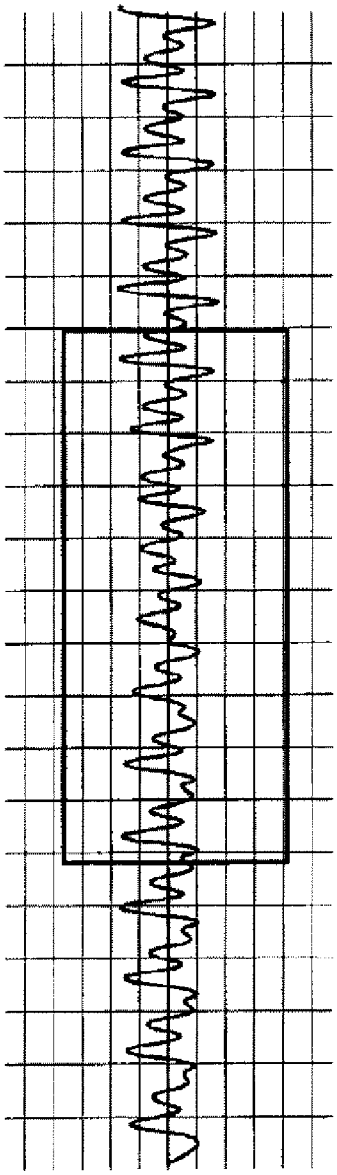
FIGS. 22A and 22B are schematic diagrams describing a signal waveform obtained when known signal interpolation processing is used.
Figure 22B:
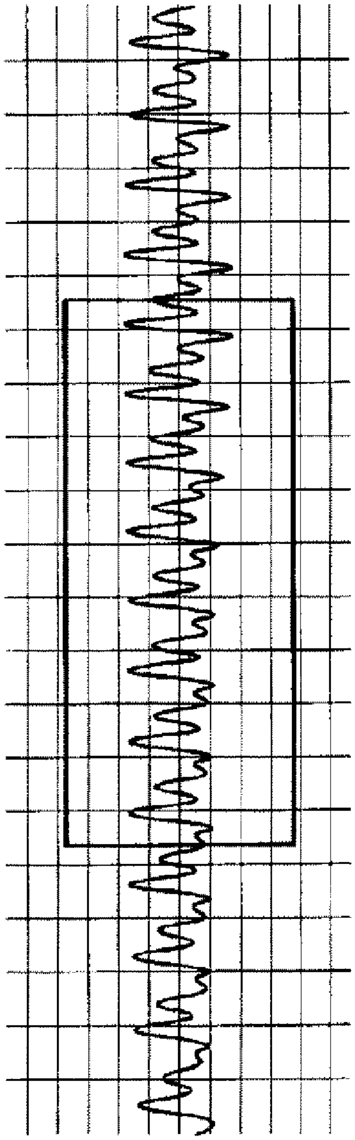

FIG. 20 is a block diagram showing a function of performing interpolation processing upon a high-frequency subband signal. In FIG. 20, the same reference numerals are used for components having the same functions as those of the audio signal interpolation apparatus 10 shown in FIG. 1 so as to avoid repeated explanation. That is, an apparatus shown in FIG. 20 is provided with the preprocessing unit 11 for performing preprocessing upon the input high-frequency subband signal x(n), the power computation unit 13 for computing signal power pow using a preprocessed signal waveform $x_{ns}(m)$, the noise generator 15 for generating the noise signal $x_{ng}(m)$, the signal processing unit 16 for performing power control processing, windowing, and overlap processing upon the noise signal $x_{ng}(n)$, and the postprocessing unit 17 for performing postprocessing upon the signal $x_w(n)$ that has undergone the signal processing in the signal processing unit 16.

This processing performed upon a high-frequency subband signal is the same as that performed when the open loop and pitch retrieval unit 12 determines that the preceding and following signals are noise signals.

The preprocessing unit 11 performs the above-described preprocessing upon the input subband signal x(n). A signal $x_n(m)$ preprocessed by the preprocessing unit 11 is output to the power computation unit 13 in which the signal power pow is calculated.

Here, the noise generator 15 generates the noise signal $x_{ng}(n)$.

The generated noise signal $x_{ng}(n)$ is output to the signal processing unit 16 and is then subjected to power processing, windowing, overlap processing, etc. therein. The signal processing unit 16 optimizes power of the signal on the basis of the power pow of the preceding and/or following signals which has been calculated by the power computation unit 13. A signal $x_{ns}(n)$ whose power has been optimized is multiplied by a window function and is then subjected to overlap processing. The signal $x_w(n)$ that has undergone the windowing and the overlap processing is output to the postprocessing unit 17, and is then subjected to preprocessing therein. The output signal y(n) is output from the postprocessing unit 17.

As described previously, an audio signal is reconstructed using the pitches and power of the preceding and following signals and the sample of the preceding or following signal. Accordingly, according to an embodiment of the present invention, patch transient characteristics can be reconstructed. Furthermore, as described previously, a non-linear power control method is used. Accordingly, according to an embodiment of the present invention, power transient characteristics can be reconstructed. Consequently, an envelope of a reconstructed signal can be similar to that of an original audio signal, and natural sound quality can be therefore achieved.

It should be understood by those skilled in the art that various modifications, combinations, sub-combinations and alterations may occur depending on design requirements and other factors insofar as they are within the scope of the appended claims or the equivalents thereof.

What is claimed is:

1. An audio signal interpolation method of performing interpolation processing on the basis of audio signals preceding and/or following a predetermined segment on a time axis so as to obtain an audio signal corresponding to the predetermined segment, the audio signal interpolation method comprising the steps of:

forming, using a waveform generator, a waveform for the predetermined segment on the basis of time-domain samples of the preceding and/or the following audio signals; and controlling, using a processor, power of the formed waveform for the predetermined segment using a non-linear model selected on the basis of the preceding audio signal when the power of the preceding audio signal is larger than that of the following audio signal, or the following audio signal when the power of the preceding audio signal is smaller than that of the following audio signal.

2. The audio signal interpolation method according to claim 1, wherein, in the step of forming a waveform, a waveform for the predetermined segment is formed by performing extrapolation using a time-domain sample of the preceding audio signal when the power of the preceding audio signal is larger than that of the following audio signal, or the following audio signal when the power of the preceding audio signal is smaller than that of the following audio signal.

3. The audio signal interpolation method according to claim 2, wherein, in the step of forming a waveform, a waveform for the predetermined segment and a waveform of the preceding or following audio signal are cross-faded in a one-pitch segment, and wherein, in the step of controlling power, power of a waveform for the predetermined segment which has been controlled using the non-linear model and power of the preceding or following audio signal are cross-faded in the one-pitch segment.

4. The audio signal interpolation method according to claim 1, wherein, in the step of controlling power, when power of the preceding audio signal is larger than that of the following audio signal, power of a waveform for the predetermined segment is controlled using a non-linear model with which power of the following audio signal is set in the middle of the predetermined segment, and, when power of the preceding audio signal is smaller than that of the following audio signal, power of a waveform for the predetermined segment is controlled using a non-linear model with which power of the preceding audio signal is increased in a portion posterior to the middle of the predetermined segment.

5. The audio signal interpolation method according to claim 1, wherein the predetermined segment is a subframe.

6. An audio signal interpolation apparatus for performing interpolation processing on the basis of audio signals preceding and/or following a predetermined segment on a time axis so as to obtain an audio signal corresponding to the predetermined segment, the audio signal interpolation apparatus comprising:

a waveform formation unit for forming a waveform for the predetermined segment on the basis of time-domain samples of the preceding and/or the following audio signals; and a power control unit for controlling power of the waveform for the predetermined segment formed by the waveform formation unit using a non-linear model selected on the basis of the preceding audio signal when the power of the preceding audio signal is larger than that of the following audio signal, or the following audio signal when the power of the preceding audio signal is smaller than that of the following audio signal.

7. The audio signal interpolation apparatus according to claim 6, wherein the waveform formation unit forms a waveform for the predetermined segment by performing extrapolation using a time-domain sample of the preceding audio signal when the power of the preceding audio signal is larger than that of the following audio signal, or the following audio signal when the power of the preceding audio signal is smaller than that of the following audio signal.

8. The audio signal interpolation apparatus according to claim 7, wherein the waveform formation unit cross-fades a waveform for the predetermined segment and a waveform of the preceding or following audio signal in a one-pitch segment, and wherein the power control means cross-fades power of a waveform for the predetermined segment which has been controlled using the non-linear model and power of the preceding or following audio signal in the one-pitch segment.

9. The audio signal interpolation apparatus according to claim 6, wherein, when power of the preceding audio signal is larger than that of the following audio signal, the power control unit controls power of a waveform for the predetermined segment using a non-linear model with which power of the following audio signal is set in the middle of the predetermined segment, and, when power of the preceding audio signal is smaller than that of the following audio signal, the power control unit controls power of a waveform for the predetermined segment using a non-linear model with which power of the preceding audio signal is increased in a portion posterior to the middle of the predetermined segment.

10. The audio signal interpolation apparatus according to claim 6, wherein the predetermined segment is a subframe.

11. An audio signal interpolation apparatus configured to perform interpolation processing on the basis of audio signals preceding and/or following a predetermined segment on a time axis so as to obtain an audio signal corresponding to the predetermined segment, the audio signal interpolation apparatus comprising:

a waveform former configured to form a waveform for the predetermined segment on the basis of time-domain samples of the preceding and/or the following audio signals; and a power controller configured to control power of the waveform for the predetermined segment formed by the waveform formation unit using a non-linear model selected on the basis of the preceding audio signal when the power of the preceding audio signal is larger than that of the following audio signal, or the following audio signal when the power of the preceding audio signal is smaller than that of the following audio signal.

* * * * *